United States Patent [19]

Aoki

[11] Patent Number: 5,290,966
[45] Date of Patent: Mar. 1, 1994

[54] CONTROL APPARATUS AND ELECTRONIC MUSICAL INSTRUMENT USING THE SAME

[75] Inventor: Eiichiro Aoki, Hamamatsu, Japan

[73] Assignee: Yamaha Corporation, Hamamatsu, Japan

[21] Appl. No.: 616,258

[22] Filed: Nov. 20, 1990

[30] Foreign Application Priority Data

Nov. 24, 1989 [JP] Japan .................................. 1-303060
Nov. 24, 1989 [JP] Japan .................................. 1-303061

[51] Int. Cl.$^5$ ............................................. G10H 1/32
[52] U.S. Cl. ...................................... 84/626; 84/737; 84/687
[58] Field of Search ................. 84/626, 737, 687, 725, 84/735; 364/236.8, 929.12

[56] References Cited

U.S. PATENT DOCUMENTS

| | | | |
|---|---|---|---|
| 4,932,304 | 6/1990 | Franzmann | 84/671 |
| 4,961,138 | 10/1990 | Gorniak | 364/200 |
| 4,980,519 | 12/1990 | Mathews | 84/735 X |
| 4,984,276 | 1/1991 | Smith | 381/63 |

FOREIGN PATENT DOCUMENTS

63-40199 2/1988 Japan .

*Primary Examiner*—William M. Shoop, Jr.
*Assistant Examiner*—Brian Sircus
*Attorney, Agent, or Firm*—Graham & James

[57] ABSTRACT

A control apparatus for an electronic musical instrument or other electronic apparatuses comprises a main body constituting an operation gripping section, a rotary member held in the main body to freely roll on an X-Y plane, a moving amount detector for detecting moving amounts of the rotary member in X- and Y-directions upon rolling of the rotary member, and a pressure detector for detecting a pressure effected on the main body. The control apparatus inputs control signals to a control object on the basis of detection values of the moving amount detector and pressure detector. An electronic musical instrument has the control apparatus as a performance operation member for controlling electronic tone generation parameters in correspondence with a performance function, and a sound source for generating an electronic tone on the basis of inputs from a keyboard and the performance operation member.

11 Claims, 9 Drawing Sheets

CHTBL

| CHF(0) | CHKCD(0) |
| CHF(1) | CHKCD(1) |
| CHF(2) | CHKCD(2) |
| CHF(3) | CHKCD(3) |

CONTROL APPARATUS AND ELECTRONIC MUSICAL INSTRUMENT USING THE SAME

BACKGROUND OF THE INVENTION

1. Field of the Invention

The present invention relates to an input control apparatus for various electronic or electrical apparatuses such as an electronic musical instrument and, more particularly, to an electronic musical instrument using such an input control apparatus as an electronic tone generation parameter control input apparatus, especially, an electronic musical instrument for generating an electronic tone corresponding to a bowed instrument.

2. Description of the Prior Art

A control input in an electronic apparatus, especially, in an electronic musical instrument or the like is made by a switch operation or a key ON/OFF operation on a keyboard. Therefore, a keyboard or switches or push buttons on an operation panel constitute an input apparatus.

A conventional input apparatus comprising such a keyboard or push buttons or various switches often confronts a problem of poor operability or operation feeling or often causes an operation error since it has separate operation units.

As a terminal input apparatus for, e.g., a computer, a mouse which can freely roll on an X-Y plane and sends an input signal corresponding to moving amounts in X- and Y-directions is used.

Since a conventional mouse sends an input signal based on only the moving amounts in the X- and Y-directions, it cannot be used when input signals corresponding to more control parameters are required.

On the other hand, an electronic musical instrument for generating a bowed instrument tone such as a violin comprises a physical sound source for generating an electronic tone which is obtained by physically approximating a mechanical vibration of a bow corresponding to a movement of a contact between a string and a bow by an electrical circuit. In such an electronic musical instrument, performance function parameters such as a bow pressure acting on a string of a bowed instrument, a bow velocity, a bow position, and the like are inputted upon operations of a keyboard consisting of a plurality of keys. More specifically, key codes representing a scale, or strengths, durations, and the like of tones are inputted according to key ON or OFF touches or timings on the keyboard and upon operations of other switches on the keyboard.

As another performance operation member, a guitar controller or a wind controller may often be used.

In the conventional electronic musical instrument, since control information corresponding to performance is inputted upon key ON/OFF operations on the keyboard or operations of switches on the keyboard, the switches and push buttons constitute separate input means, and a player (operator) must move his or her hands to select and operate switches or the like every time he or she wants to control musical tone parameters. Therefore, this results in poor operability for musical tone control, technical difficulty in actual performance, and a performance control operation error.

The conventional guitar controller or wind controller has its principal object to imitate an acoustic instrument, i.e., to attain resemblance to the acoustic instrument, and cannot attain musical tone control with good operability and excellent performance feeling.

Since a conventional mouse-type input control apparatus is moved to an arbitrary position on the X-Y plane at an arbitrary speed to perform input control, it has very good operability. However, since a control apparatus of this type sends only position data in the X- and Y-directions as input information, it cannot be used for a control object such as an electronic musical instrument which must perform input control for a large number of control parameters.

SUMMARY OF THE INVENTION

Objects

The present invention has been made in consideration of the above situation, and has as its first object to provide a control apparatus which is obtained by improving a conventional mouse structure to increase the number of input parameters, so that the mouse structure can be applied to an electronic equipment such as an electronic musical instrument having a large number of control parameters, and that control signals can be inputted corresponding to a large number of control parameters upon movement of the mouse.

It is a second object of the present invention to provide an electronic musical instrument which can simultaneously and efficiently control a large number of control parameters in such a manner that control information corresponding to performance of an electronic musical instrument such as a bowed instrument is inputted not only by a keyboard or the like but by a mouse-type input control apparatus comprising a pressure detection means.

Arrangement of First Aspect

In order to achieve the above objects, a control apparatus according to the present invention comprises a main body constituting an operation gripping section, a rotary member which is held in the main body to freely roll on an X-Y plane, moving amount detection means for detecting moving amounts of the rotary member in X- and Y-directions upon rolling of the rotary member, pressure detection means for detecting a pressure with respect to the X-Y plane, and connecting means for connecting the moving amount detection means and pressure detection means with a control object.

Operation

A pressure of the rotary member such as a mouse with respect to an operation X-Y plane is detected upon operation of the rotary member, and is used as an input control signal as well as the moving amounts thereof in the X- and Y-directions.

Arrangement of Second Aspect

An electronic musical instrument according to the second aspect of the present invention comprises a mouse-type input control apparatus for generating musical tone generation parameters including at least a velocity parameter in correspondence with performance functions, and a sound source for generating an electronic tone on the basis of inputs from the input apparatus. The instrument also comprises a pitch designation means for generating key codes, as needed. In the sound source, a pitch of an electronic tone is designated on the basis of the key code.

The mouse-type input control apparatus comprises a moving amount detection means for detecting moving amounts in X- and Y-directions on an operation X-Y plane, and a detection means for detecting a pressure on the X-Y plane.

Operation

When the mouse-type input control apparatus is moved on the X-Y plane, pressure data can be obtained as well as position data in the X- and Y-directions, and a velocity parameter, a pressure parameter, and the like of an electronic musical instrument are calculated on the basis of these data and are used as musical tone control input signals.

DETAILED DESCRIPTION OF THE PREFERRED EMBODIMENTS

The preferred embodiments of the present invention will be described below with reference to the accompanying drawings.

Figure 1:
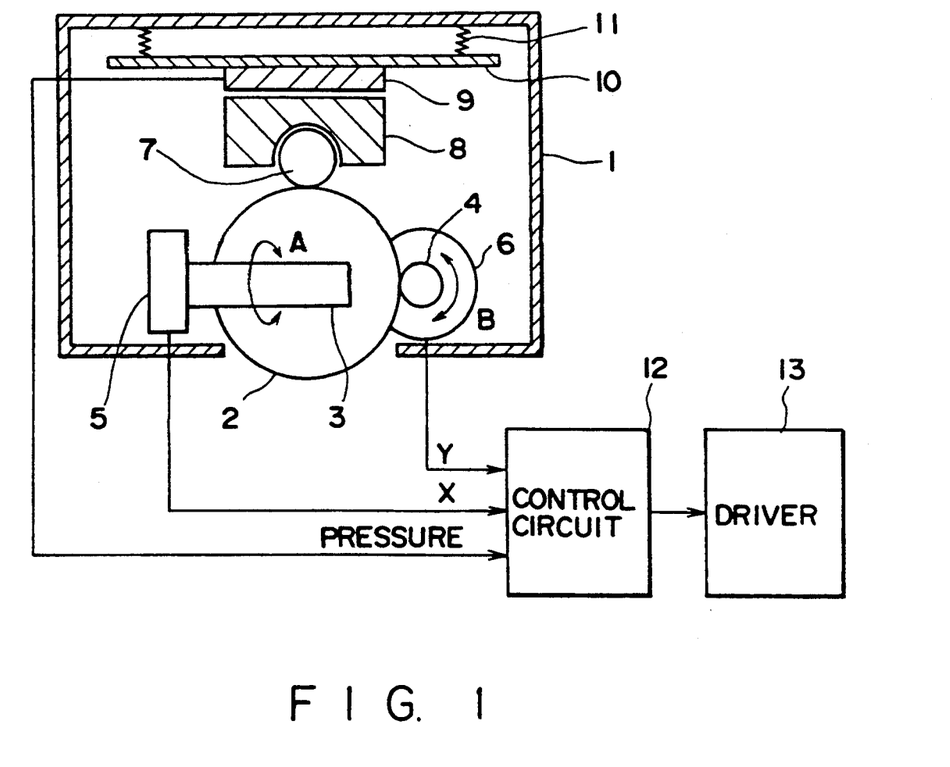
FIG. 1 is a diagram showing an arrangement of a mouse-type input control apparatus according to the present invention.

FIG. 1 is a diagram showing an input control apparatus according to an embodiment of the present invention.

A main body 1 comprising a housing having an appropriate shape which is easy to grip constitutes an operation gripping section of a mouse. A rotary member 2 comprising a ball-like member is mounted in the main body 1. The rotary member 2 is rotatably held by the main body 1 by an appropriate means. A mouse can freely roll in arbitrary directions on the X-Y plane through this rotary member 2. Rollers 3 and 4 for detecting X- and Y-moving amounts are urged against the rotary member 2 to be rotatable, as indicated by arrows A and B. Rotary encoders 5 and 6 for detecting rotations are attached to end portions of the X- and Y-rollers 3 and 4. For example, the rotary encoders 5 and 6 respectively have predetermined continuous patterns, and detect rotations of these continuous patterns to generate pulse signals, thereby allowing detection of rotational amounts, rotational speeds, and rotational directions in the X- and Y-direction. These rotary encoders 5 and 6 are fixed in the main body 1 by an appropriate means.

A ball bearing 7 held by a holder 8 is arranged on the upper surface of the rotary member 2. A pressure sensor 9 is arranged on the back surface of the holder 8. The pressure sensor 9 is fixed to a support plate 10. The support plate 10 is elastically mounted on the main body 1 via springs 11.

The X- and Y-rotary encoders 5 and 6 are connected to a control circuit 12. The pressure sensor 9 is also connected to the control circuit 12. The control circuit 12 is connected to a driver 13 of, e.g., an electronic tone generation apparatus of an electronic musical instrument or another control object.

An operation of the mouse-type input control apparatus with the above arrangement is as follows. That is, an operator holds the main body 1 with his or her hand, and moves it while rolling the rotary member 2 on the operation X-Y plane (not shown). At this time, the rotary member 2 rolls on the X-Y plane while being pressed on the X-Y plane. Upon rotation of the rotary member 2, the X- and Y-rollers 3 and 4 arranged in the main body 1 are rotated. Rotations of these rollers 3 and 4 are detected by the X- and Y-rotary encoders 5 and 6, respectively, and are supplied as X- and Y-rotation detection signals to the control circuit 12.

When the rotary member 2 is pressed against the X-Y plane, the pressure sensor 9 is pressed according to a pressure via the ball bearing 7 and its holder 8. Thus, an operation pressure upon operation of the mouse is detected. This pressure detection signal is supplied to the control circuit 12 together with the X- and Y-rotation detection signals (X- and Y-position data). The control circuit 12 performs predetermined arithmetic processing using these detection signals, and calculates control amounts of a plurality of predetermined control parameters. Control signals according to the calculated control amounts are imputted to the driver 13, and the driver 13 performs predetermined operations according to operation of the mouse.

Figure 2:
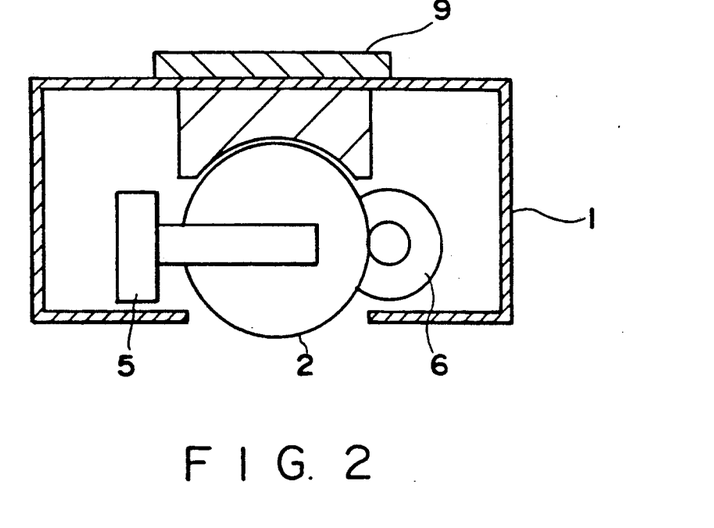
FIG. 2 is a sectional view showing a main part of a mouse-type input control apparatus according to another embodiment of the present invention.

FIG. 2 is a sectional view showing a mouse-type input control apparatus according to another embodiment of the present invention.

In this embodiment, a pressure sensor 9 is arranged on the upper surface of a main body 1. When the pressure sensor 9 is pressed by a hand upon operation of the mouse, a pressure on the mouse with respect to an operation plane can be detected. Other arrangements, operations, and effects are the same as those in the embodiment shown in FIG. 1.

Figure 3:
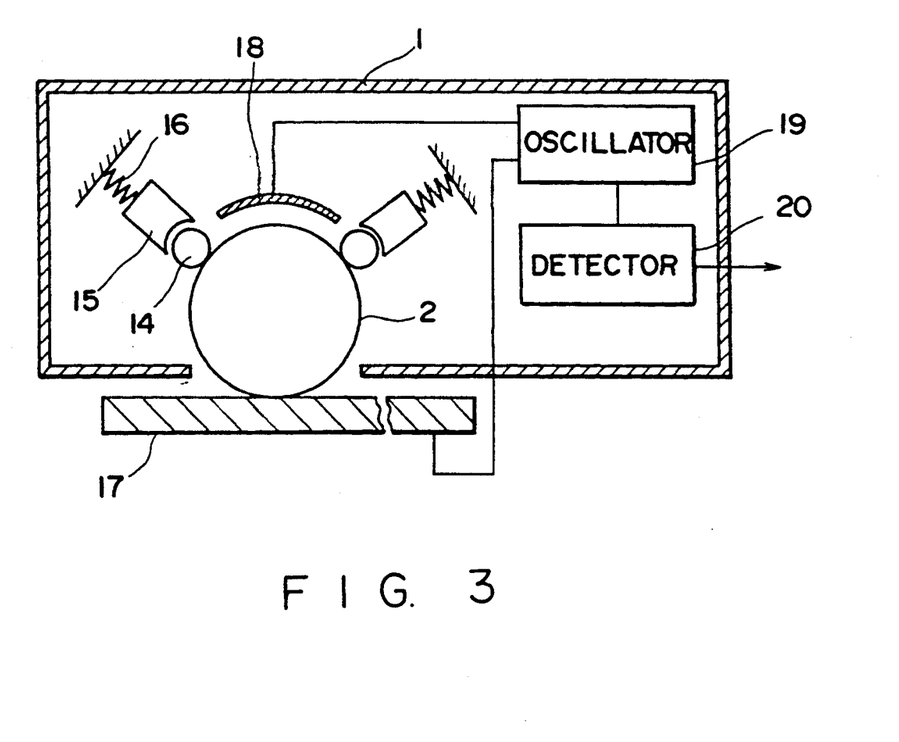
FIG. 3 is a sectional view showing a main part of a mouse-type input control apparatus according to still another embodiment of the present invention.

FIG. 3 is a sectional view showing a mouse-type input control apparatus according to still another embodiment of the present invention.

In this embodiment, a rotary member 2 is held in the main body 1 via ball bearings 14 held by holders 15. Each holder 15 is mounted on one end portion of a spring 16 whose other end portion is fixed to the main body 1. Therefore, the rotary member 2 can be vertically displaced against the elastic force of the springs 16.

An electrode 18 is arranged above the upper surface of the rotary member 2. The electrode 18 is connected to an oscillator 19 for detecting a capacitance. The oscillator 19 is connected to an external control circuit 12 (see FIG. 1) through a detector 20.

The mouse of this embodiment is operated on an operation plate 17 formed of a metal plate. The metal operation plate 17 is electrically connected to the oscillator 19 in the mouse main body 1.

With this arrangement, when the mouse main body 1 is moved while being pressed against the metal operation plate 17, the rotary member 2 is vertically displaced according to a pressure. Since the rotary member 2 is electrically connected to the metal operation plate 17, a distance between its upper surface and the electrode 18 is changed according to the vertical displacement of the rotary member 2, thereby changing a capacitance. A change in capacitance is detected by the oscillator 19, and is supplied to an external circuit through the detector 20 as a detection signal corresponding to the pressure on the mouse. Other arrangements, operations, and effects are the same as those in the embodiment shown in FIG. 1.

Figure 4:
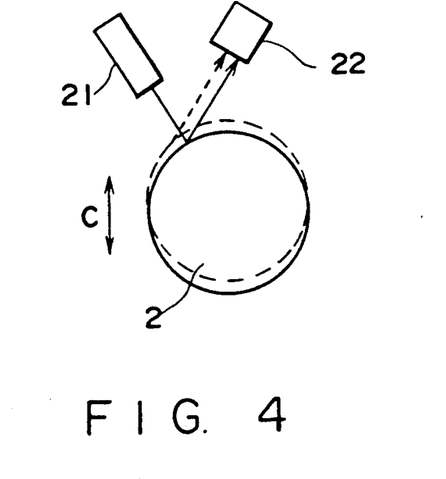
FIGS. 4 to 6 are views showing arrangements of modifications of the embodiment shown in FIG. 3.
Figure 5:
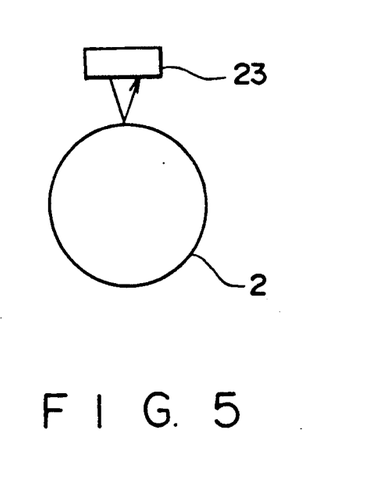
Figure 6:
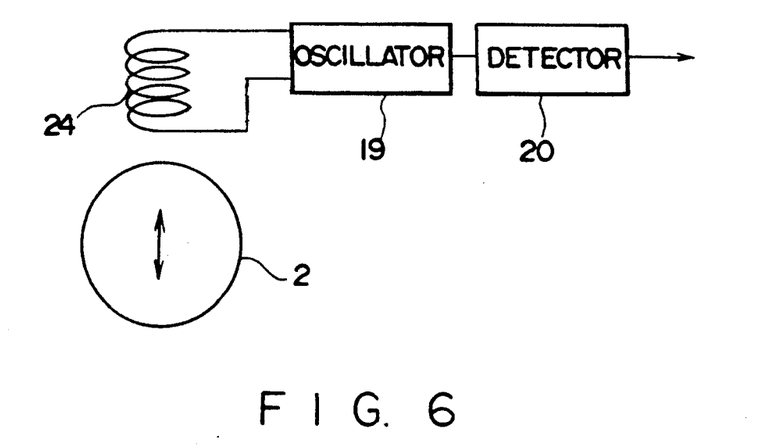

FIGS. 4, 5, and 6 show modifications of the embodiment shown in FIG. 3. In each modification, a detection means for detecting a vertical displacement of the rotary member 2 in the embodiment shown in FIG. 3 is modified. Other arrangements are the same as those in embodiment of FIG. 3.

In the modification shown in FIG. 4, light reflected by the rotary member 2 is detected by a photosensor comprising a light-emitting means 21 such as a light-emitting diode, and a light-receiving means 22 such as a light-receiving diode. When the rotary member 2 is vertically displaced, as indicated by a double-headed arrow C, the position of reflected light is changed like a dotted curve according to the displacement. Therefore, a pressure on the mouse is detected as a change in position of reflected light.

In the modification shown in FIG. 5, an ultrasonic sensor 23 comprising an ultrasonic vibrator and a detector is used. The ultrasonic sensor 23 radiates an ultrasonic wave onto the rotary member 2, and detects a wave reflected thereby, thereby detecting a vertical displacement of the rotary member 2.

In the modification shown in FIG. 6, the rotary member 2 is formed of a magnetic material, and a coil 24 is arranged above the upper surface of the magnetic rotary member 2. Upon vertical displacement of the rotary member 2, the inductance of the coil 24 is changed, and a change in inductance is detected, thereby obtaining a detection signal according to a pressure on the mouse.

Figure 7:
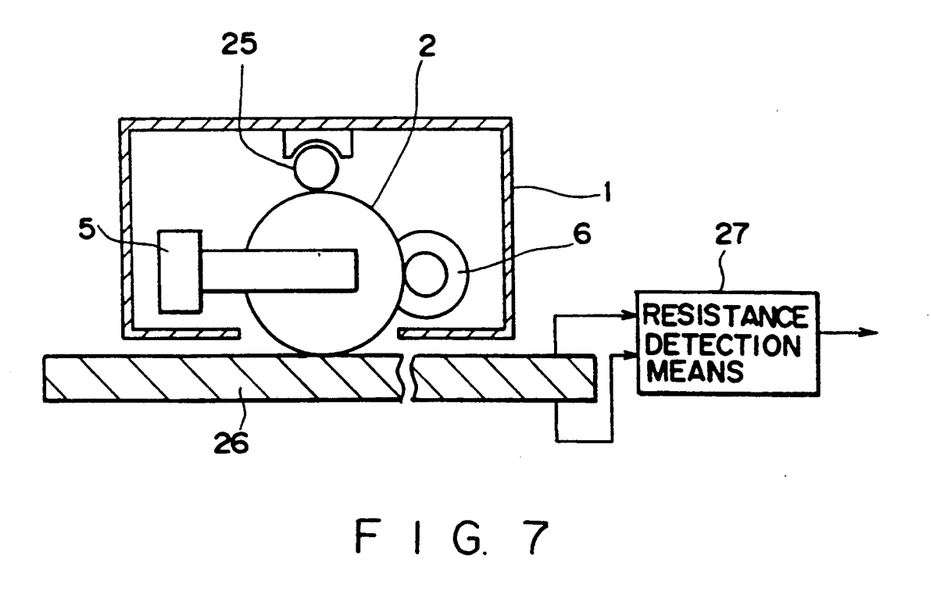
FIG. 7 is a sectional view showing a main part of a mouse-type input control apparatus according to still another embodiment of the present invention.

FIG. 7 is a sectional view showing a mouse-type input control apparatus according to still another embodiment of the present invention.

In this embodiment, a rotary member 2 is not vertically displaced with respect to a main body 1, and is in contact with a ball bearing 25 arranged on the inner upper surface of the main body 1 to be held at a predetermined position. The mouse of this embodiment is moved on a conductive rubber plate 26 for detecting a pressure. When the mouse is pressed against the rubber plate 26, a thickness between the upper and lower surfaces of the rubber plate is changed according to the pressure, and a resistance is changed. The change in resistance is detected by a detection means 27, thereby obtaining a detection signal corresponding to the pressure on the mouse.

In each of the above embodiments, the X- and Y-moving amounts of the mouse are detected using the rotary encoders attached to the rollers pressed against a spherical rotary member. However, the present invention is not limited to this. For example, two orthogonal rollers having X- and Y-rotational shafts may directly roll on the X-Y operation plane, and their rotations may be detected.

An electronic musical instrument which employs the mouse-type input operation member with the arrangement of each of the above embodiments as an input apparatus for an electronic tone generation sound source together with a keyboard will be described below.

Figure 8:
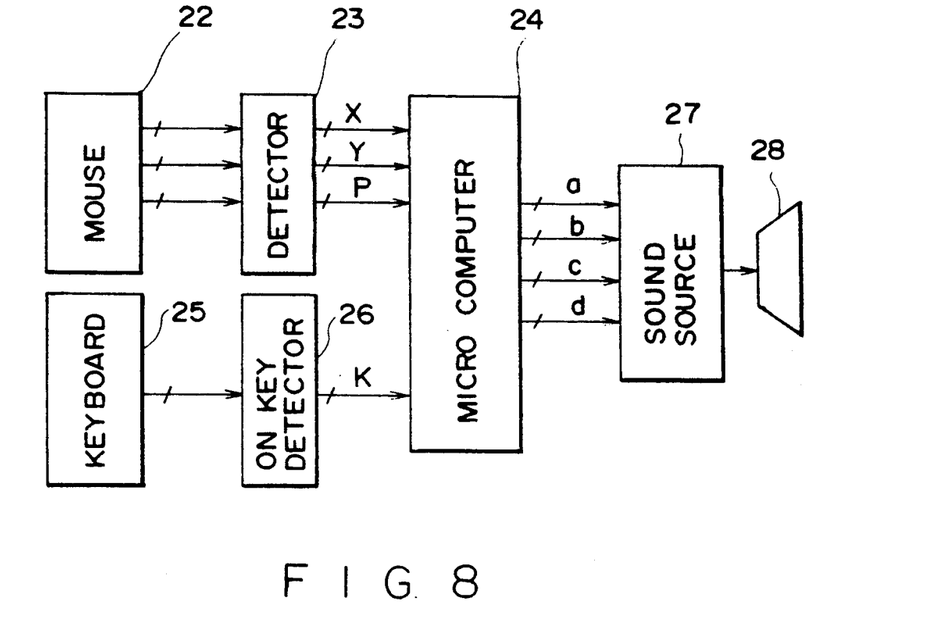
FIG. 8 is a block diagram of an electronic musical instrument using a mouse-type input control apparatus according to the present invention.

FIG. 8 is a block diagram showing the overall arrangement of an electronic musical instrument. A performance operation member 22 comprising the above-mentioned mouse is connected to a microcomputer (CPU) 24 via a detector 23. The microcomputer 24 is also connected to a keyboard 25 via an ON key detector 26. The output terminal of the microcomputer 24 is connected to a sound source 27. The sound source 27 is connected to a sound system 28 comprising an amplifier and a loudspeaker.

X- and Y-positions, and a pressure of the above-mentioned performance operation member (mouse) 22 are detected by corresponding detectors (illustrated as the detector 23 as a whole in FIG. 8) as performance function control parameters such as a bow velocity, a bow pressure, and the like of a bowed instrument such as a violin. Signal lines X, Y, and P in FIG. 8 represent X- and Y-position detection signals and a pressure detection signal of the mouse, respectively. These detection signals are converted into signals which can be used as position data, and the like by, e.g., a A/D converter, and the converted signals are inputted to the microcomputer (CPU) 24. An ON key depressed upon operation of the keyboard 25 is detected by the ON key detector 26. The ON key detection signal is converted into a frequency of a predetermined tone number, and the converted frequency is inputted to the microcomputer 24. A signal line K represents a key code detection signal of the ON key.

The microcomputer 24 performs predetermined arithmetic processing on the basis of the detection signals and other input data to calculate a bow velocity signal a, a bow pressure signal b, a pitch signal c, and other parameters d such as a decay coefficient, and inputs them to the sound source 27. A musical tone is synthesized in the sound source 27 on the basis of the parameters controlled upon operation of the performance operation member 22, and is outputted as a performance tone of a bowed instrument such as a violin by the sound system 28.

The relationship between the detection signal of the performance operation member and control input parameters of the sound source will be described in detail below.

Figure 9:
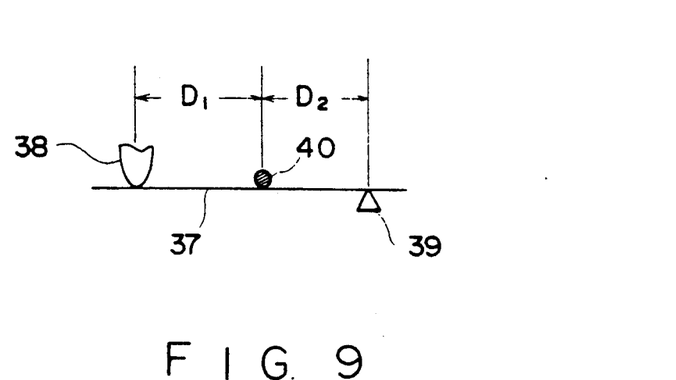
FIG. 9 is a view showing the positional relationship between a string and a bow.

FIG. 9 shows a model of a string and a bow of a bowed instrument. Reference numeral 37 denotes a string; 38, a finger position; 39, a bridge; and 40, a bow position. A distance between the finger 38 and the bow 40 is represented by D1, and a distance between the bridge 39 and the bow 40 is represented by D2. D1+D2 is determined by a key code. D1 and D2 correspond to delay times of a musical tone synthesis/delay circuit (to be described later) corresponding to resonance frequencies of bow portions on two sides of the bow 40.

An operation speed is calculated as $V=(\Delta X^2+\Delta Y^2)^{\frac{1}{2}}$ on the basis of changes $\Delta X$ and $\Delta Y$ in X- and Y-position data. Data such as the X- and Y-positions, the operation speed, and the mouse pressure P are used as musical tone control parameters corresponding to a bow velocity, a bow position, a bowed string position, a bow pressure, and the like. Correspondences between detected arithmetic data and control parameters can be appropriately combined according to kinds of electronic musical instrument, an arrangement of a sound source, and the like.

For example, as a first input mode of control parameters, pressure data is inputted as a bow pressure parameter, and $(\Delta X^2 + \Delta Y^2)^{\frac{1}{2}}$ is calculated based on X- and Y-position data. The calculated data is inputted as a bow velocity parameter.

As a second input mode, pressure data is inputted as a bow pressure parameter, X-position data is inputted as a bow velocity parameter, and Y-position data is inputted as a bow velocity parameter.

As a third input mode, pressure data is inputted as a bow pressure parameter, X-position data is inputted as a bow velocity parameter, and Y-position data is inputted as a parameter for, e.g., vibrato.

In the second and third input modes, the bow velocity may be calculated based on changes in positions ($\Delta X$ and $\Delta Y$), or positions may be directly converted into velocity data. In this case, a calculation method is selected upon selection of a calculation mode. The above-mentioned modes may be selected upon selection of modes. Alternatively, an arco mode (bowed with a bow), a pizzicato mode (played with fingers), a col legno mode (tapping a wood portion), and the like may be selected. In this case, a selection switch may be arranged on a mouse or on a musical instrument main body.

Figure 10:
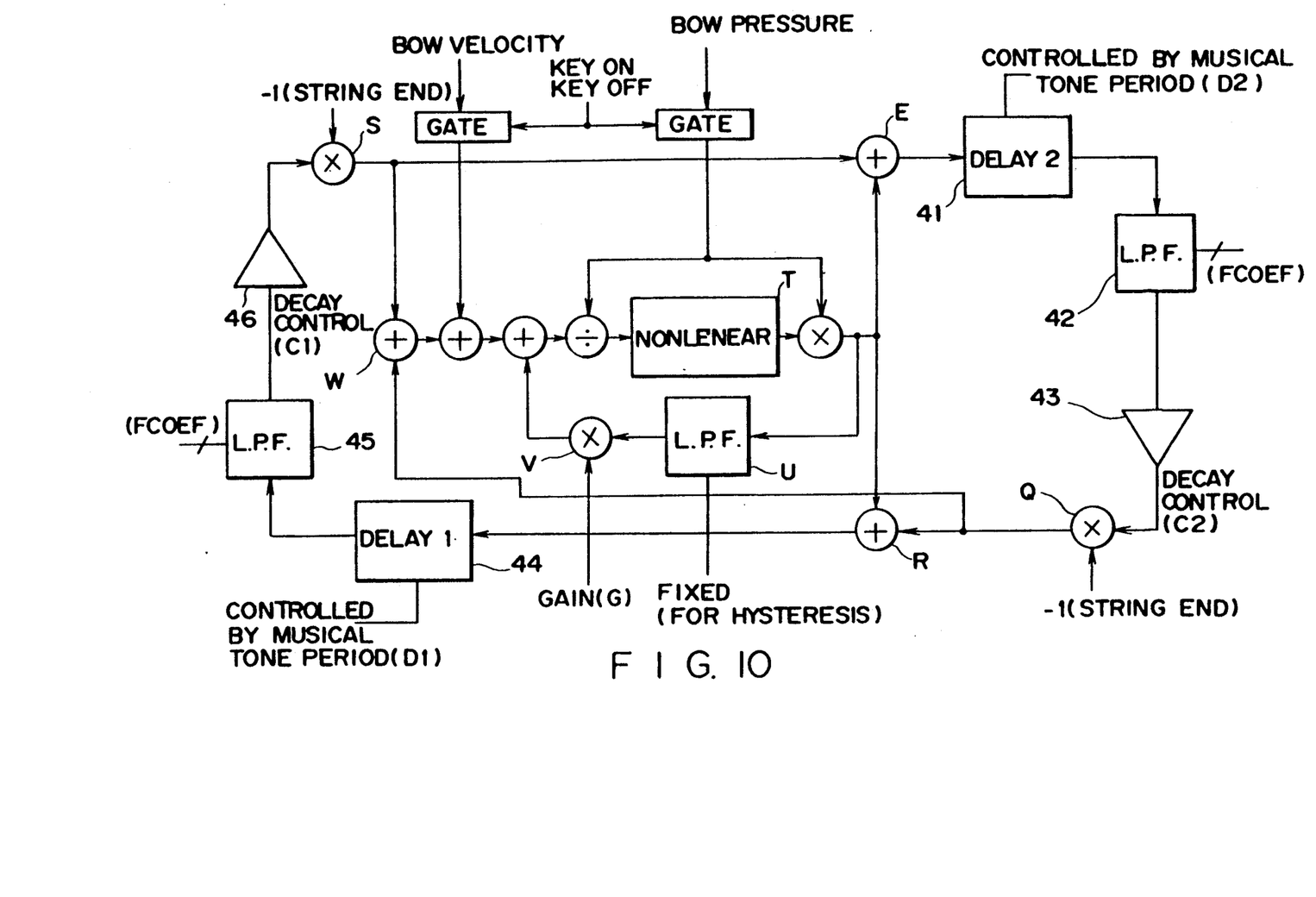
FIG. 10 is a circuit diagram showing a sound source.

FIG. 10 shows a circuit arrangement of a physical sound source for synthesizing an electronic tone corresponding to the model of the string and the bow described above. Reference symbols E and R denote adders which correspond to a bowed point (the bow 40 in FIG. 9); and Q and S, multipliers which correspond to string ends (the positions of the finger 38 and the bridge 39 shown in FIG. 9) on two sides of the bowed point. A closed loop constituted by the adder E, a delay circuit 41, a low-pass filter (LPF) 42, an attenuator 43, and the multiplier Q corresponds to a string portion on one side of the bowed point. Similarly, a closed loop constituted by the adder R, a delay circuit 44, an LPF 45, an attenuator 46, and the multiplier S corresponds to a string portion on the other side of the bowed point.

Reference symbol T denotes a nonlinear function generator. The nonlinear function generator receives a signal obtained by adding a signal corresponding to a bow velocity to a signal obtained by synthesizing outputs from the closed loops on two sides of the bowed point by an adder W through a gate which is operated in correspondence with a key ON/OFF operation, and adding a signal from an LPF U for a fixed hysteresis and a gain G inputted to a multiplier V to the sum signal. Hysteresis control of the nonlinear function generator T is performed by a signal corresponding to the bow pressure inputted through another gate which is operated in correspondence with a key ON/OFF operation.

In the sound source circuit with the above arrangement, a bow velocity signal is obtained by arithmetic processing of position detection signals of the mouse, and a bow pressure signal is obtained based on a pressure detection signal. Delay times of the delay circuits 41 and 44 correspond to a bow position (i.e., D1 and D2 (FIG. 9)), and this bow position is determined on the basis of the X-position data in, e.g., the second input mode. Cutoff frequencies as parameters of the LPFs 42 and 45 determine a tone color of a musical tone. A decay speed may be obtained based on the Y-position detection signal of the mouse.

As described above, when the detection signals of the mouse as the performance operation member are inputted as parameters for the corresponding circuits of the sound source, an electronic tone according to a bowed mode of the bowed instrument can be generated.

Figure 11:
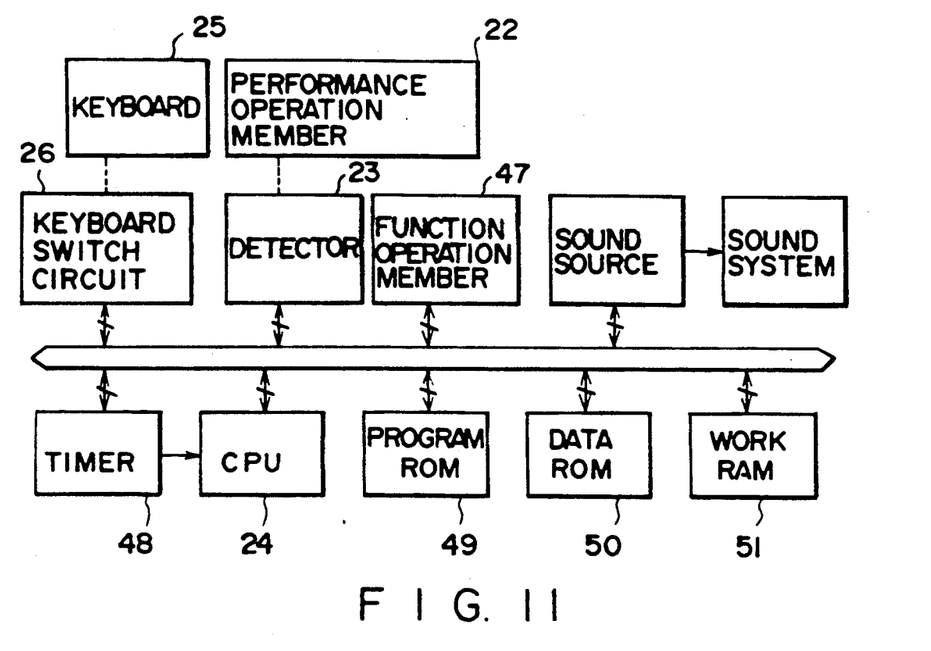
FIG. 11 is a block diagram of a musical tone control mechanism according to the present invention.

FIG. 11 is a block diagram of a control mechanism of an electronic musical instrument according to the present invention. As described above, signals from the performance operation member (mouse) 22 and the keyboard 25 are inputted from a bus line to the CPU 24 via the detector 23 and the ON key detector 26. The CPU 24 reads out necessary data from a program ROM 49 for storing routine programs, a data ROM 50 for storing data necessary for arithmetic processing, and a work RAM 51 for storing intermediate calculation results in the arithmetic processing, and calculates musical tone control parameters, as described above. A function operation member 47 is normally used to select a tone color, vibrato, and the like, and to switch various modes. In this embodiment, the function operation member 47 is used to switch bow position and bow velocity detection modes, and to select calculation method modes. A timer 48 is used to execute an interrupt routine at a predetermined fixed period of several ms during the main routine of the CPU 24.

Figure 12:
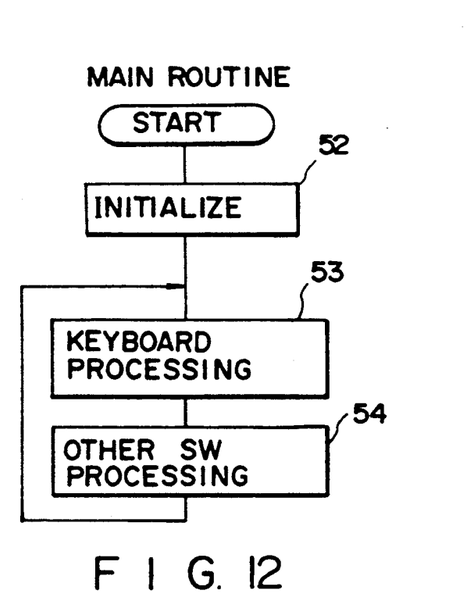
FIG. 12 is a flow chart of a main routine.

FIG. 12 shows a basic main routine. In step 52, the system is initialized, and various musical tone parameters are set to be predetermined initial values. Thereafter, ON key switch processing (step 53) on the keyboard and other switch processing (step 54) are repeated. The interrupt routine (to be described later) is executed at the predetermined period in the main routine, thereby calculating the above-mentioned control input parameters.

Figure 18:
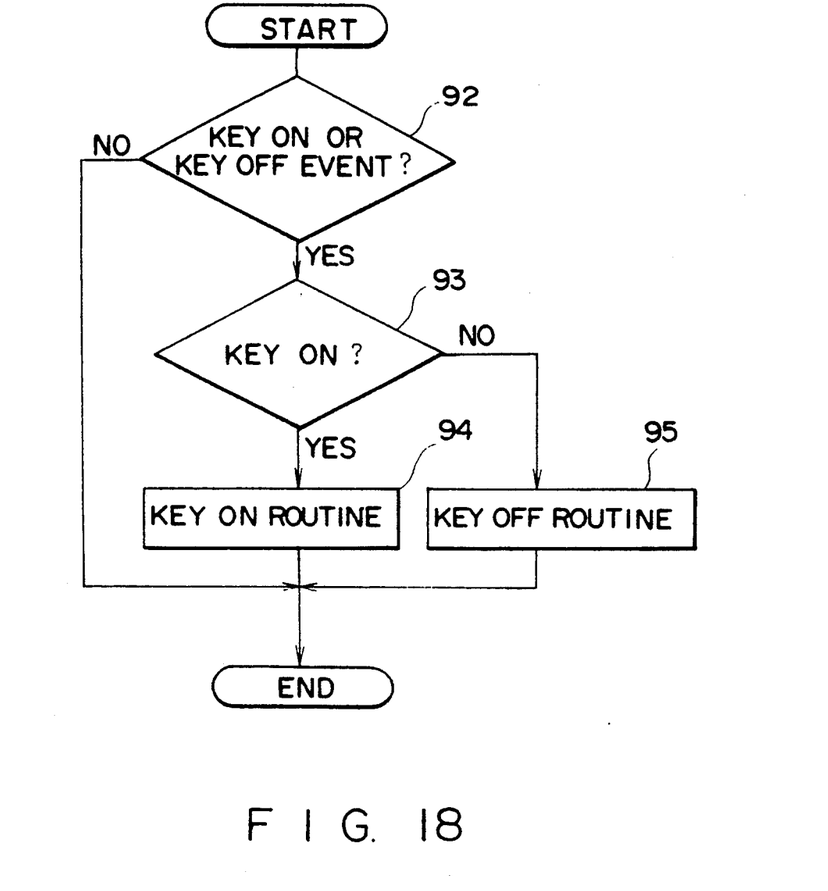
FIG. 18 is a flow chart of a routine in the keyboard processing step shown in FIG. 12.

FIG. 18 shows the ON key processing routine in step It is checked in step 92 if a key ON or OFF event is detected. If NO in step 92, step 53 is ended, and the control advances to the next switch processing (step 54). If YES in step 92, it is checked in step 93 if the key ON event is detected. If YES in step 93, the control advances to a key ON routine (step 94); otherwise, the control advances to a key OFF routine (step 95).

Figure 13:
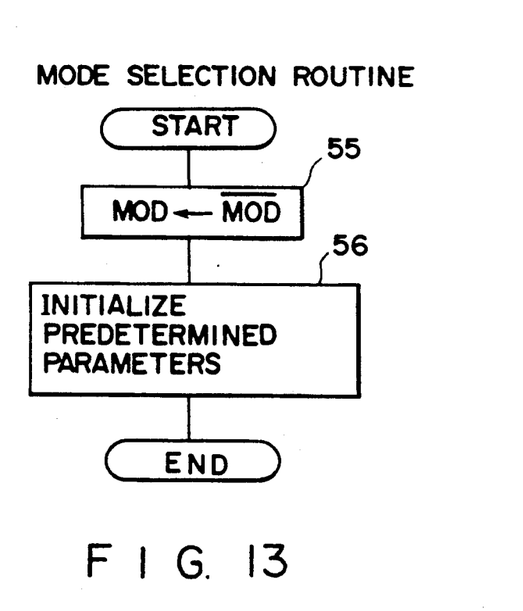
FIG. 13 is a flow chart of a mode selection routine.

FIG. 13 shows a mode selection routine. In step 55, mode selection of, e.g., a detection mode is performed, and a detection result is stored in a register for the next detection arithmetic processing. Parameters processed on the basis of detection data are initialized in step 56. More specifically, previous X- and Y-position data are set for position change arithmetic processing or the like (POSX←POSXO, POSY←POSYO), and a filter coefficient (ECOEF) is set to be a standard value.

Figures 14, 15, 16:
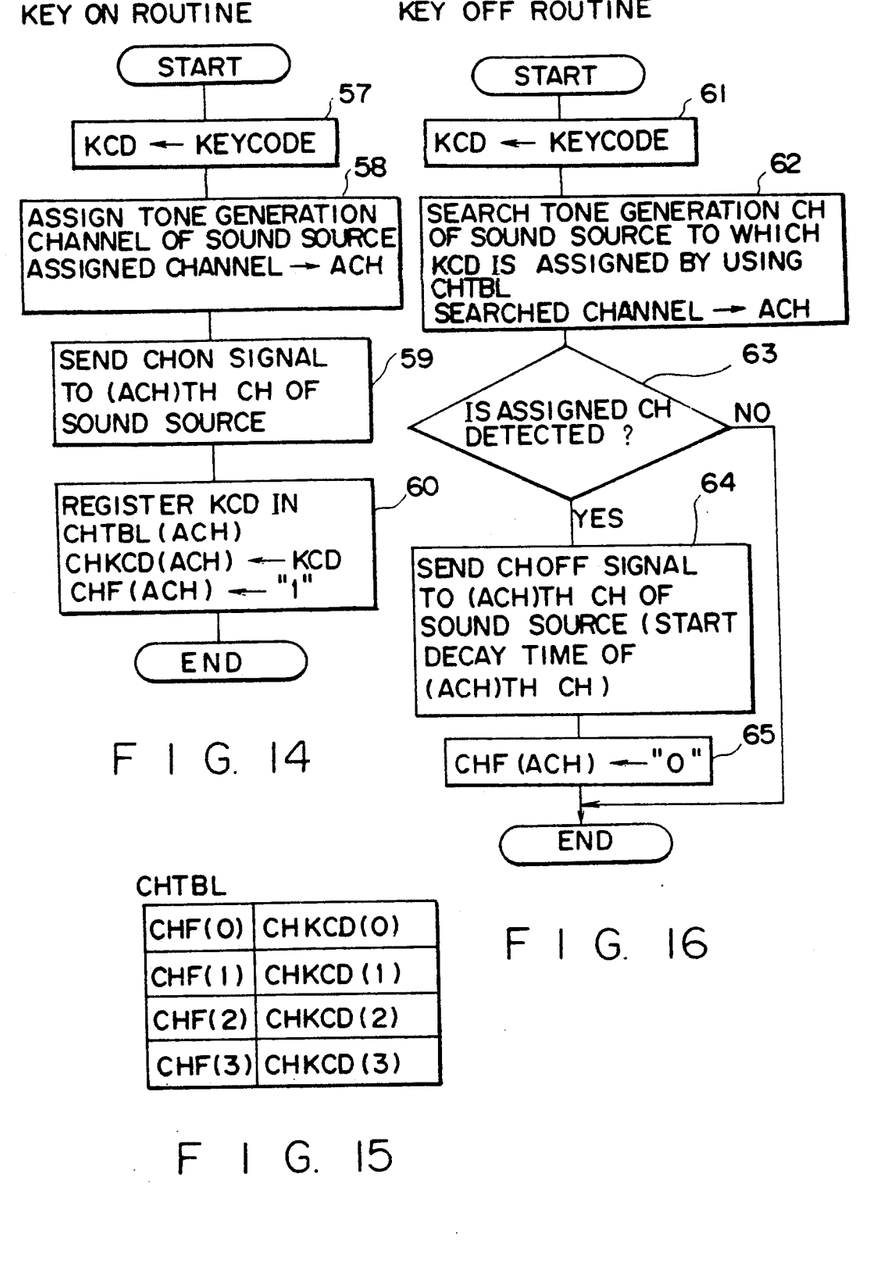
FIG. 14 is a flow chart of a key ON routine.
FIG. 15 is a view for explaining a channel table.
FIG. 16 is a flow chart of a key OFF routine.

FIG. 14 shows the key ON routine. A key code of an ON key is stored in a key code register (KCD) (step 57). A tone generation channel of the sound source is then assigned. The assigned channel is stored in an assigned channel register (ACH) (step 58). A channel ON signal is sent to the assigned channel of the sound source (step 59). A key code is registered in the assigned channel (ACH) of a channel table shown in FIG. 15 (step 60). A signal "1" is inputted to a flag of a channel in which the key code is registered. In the table shown in FIG. 15, the number of channels is four, but may be five or more.

FIG. 16 shows the key OFF routine. A key code of an OFF key is stored in the register KCD (step 61). The tone generation channel of the sound source to which the key code is assigned is searched using the channel table (step 62). It is checked in step 63 if such a channel is detected. If NO in step 63, the routine is ended; otherwise, a channel OFF signal is sent to the detected tone generation channel of the sound source, thereby cutting a tone of this channel (step 64). At this time, a decay time of the cut tone is started. A signal "0" is inputted to a channel flag of the channel table, which flag corresponds to the OFF channel (step 65).

Figure 17:
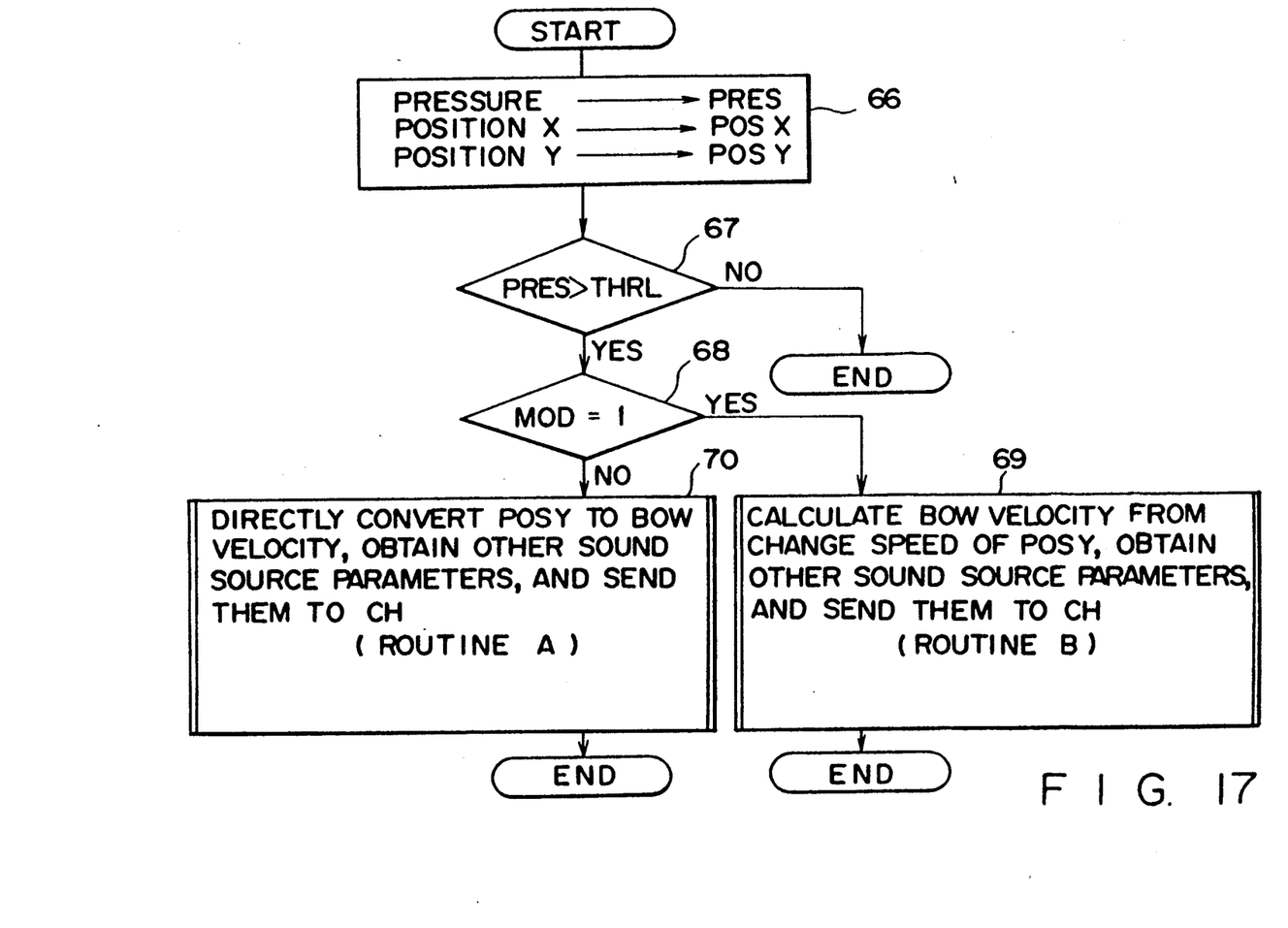
FIG. 17 is a flow chart of an interrupt routine.

FIG. 17 shows the interrupt routine which interrupts the main routine at a predetermined period in response to a fixed clock. The detection values of the mouse, i.e., the pressure P and the positions X and Y are stored in corresponding registers PRES, POSX, and POSY (step 66). In step 67, it is checked if the pressure data PRES is larger than a predetermined threshold value (THRL). If NO in step 67, an input value is ignored as noise. However, if YES in step 67, it is checked in step 68 if a register MOD is "1". If NO in step 68, a bow velocity v is directly obtained from the Y-position data of the mouse using a table which is formed and stored in advance (step 70). Furthermore, other sound source parameters are obtained on the basis of other input data according to another routine, and are sent to the corresponding channels of the sound source.

If it is determined in step 68 that the register MOD is "1", the control advances to step 69 and a change speed of the position Y is obtained based on a difference between the present and previous position data, thus calculating the bow velocity. At this time, since detection timing intervals are constant, the difference between the positions directly corresponds to the change speed. Furthermore, other sound source parameters are obtained on the basis of other input data according to another routine, and are sent to the corresponding channels of the sound source.

The number of channels of the sound source is set to be four in correspondence with, e.g., the number of strings of a violin (see the channel table shown in FIG. 15). When a plurality of sound source channels are provided, a reverberation effect of an original sound source channel can be obtained when a key ON signal transits from one channel to another channel.

When the sound source channels are arranged, a number i is set to check channels one by one in steps 69 and 70 in the interrupt routine (FIG. 17), and this routine is executed while changing i from 0 to 3. Whether or not the channel flag is "1" can determine a tone generation channel to which the key code is inputted (key ON). A key code (CHKCD) of the key ON channel is inputted to the key code register (KCD). The bow velocity v, the bow pressure PRES, and other musical tone control parameters are inputted to the key ON ith channel. The sound source circuit (FIG. 10) generates an electronic tone on the basis of these input signals.

In the above embodiment, the sound source is not limited to the circuit shown in FIG. 10. For example, an arithmetic type sound source (FM sound source or high-frequency synthesis sound source), a waveform memory type sound source, or a composite type sound source of the former two sound sources may be used, and their parameters may be controlled.

In the above embodiment, musical tone parameter control is attained by software control but may be realized by an exclusive hardware arrangement. In the above embodiment, an electronic musical instrument corresponding to a bowed instrument using a bow has been exemplified. However, the present invention is not limited to bowed instruments. The sound source to be controlled is not limited to polyphonic tones but may be monophonic tones. In the above embodiment, tone generation control is performed depending on key ON/OFF events on the keyboard. However, the keyboard may be used to simply designate pitches, and tone generation control may be directly performed by an input operation member (mouse).

A means for designating pitches is not limited to the keyboard.

Effect of the Invention

As described above, according to the present invention, a pressure detection means is arranged on a mouse as an input control apparatus, so that not only X-and Y-moving amounts but also an operation pressure can be simultaneously detected upon movement of the mouse. Thus, the number of control parameters can be increased, and an input control operation can be efficiently performed, thus improving operability.

If the input apparatus of the present invention is used as one for controlling musical tone parameters of an electronic musical instrument, various musical tone parameters can be simultaneously and smoothly controlled while arbitrarily moving it on a plane as a performance operation member corresponding to, e.g., a bow of a bowed instrument as well as a keyboard. As a result, an electronic musical instrument with improved operability and good performance feeling during performance can be provided.

What is claimed is:

1. A control apparatus for controlling a control object comprising:
    a main body constituting an operation gripping section;
    a rotary member held in said main body to freely roll on an X-Y plane;
    moving amount detection means for detecting moving amounts of said rotary member in X- and Y-directions upon rolling of said rotary member;
    pressure detection means for detecting a pressure with respect to the X-Y plane; and
    control means for calculating a moving velocity based on either or both of the detected moving amounts of said rotary member in X- and Y-directions to control and the control object on the basis of the calculated moving velocity.

2. An electronic musical instrument comprising:
    a mouse-type input control apparatus to be manipulated by a player, having a moving amount detection means for detecting moving amounts of the apparatus in X- and Y- directions on an operation X-Y plane;
    control means for calculating a moving velocity of the apparatus based on either or both of the detected moving amounts in X- and Y-directions to output the calculated moving velocity as one of plural electronic tone generation parameters; and
    a sound source for generating an electronic tone signal on the basis of the calculated moving velocity.

3. An electronic musical instrument according to claim 2, wherein the mouse-type input control apparatus further has a pressure detection means for detecting a pressure of the apparatus on the operation X-Y plane, the control means outputs the detected pressure as another of the electronic tone generation parameters, and the sound source generates an electronic tone signal on the basis of the calculated moving velocity and detected pressure.

4. An electronic musical instrument comprising:

a pitch designation means for generating a key code;

a mouse-type input control apparatus to be manipulated by a player, having a moving amount detection means for detecting moving amounts of the apparatus in X- and Y-directions on an operation X-Y plane;

control means for calculating a moving velocity of the apparatus based on either or both of the moving amounts in X-and Y-directions to output the calculated moving velocity as one of plural electronic tone generation parameters; and a sound source for generating an electronic tone signal on the basis of the calculated moving velocity and the generated key code.

5. An electronic musical instrument according to claim 4, wherein the mouse-type input control apparatus further has a pressure detection means for detecting a pressure of the apparatus on the X-Y plane, the control means outputs the detected pressure as another of the electronic tone generation parameters, and the sound source generates an electronic tone signal on the basis of the calculated moving velocity, the detected pressure and the generated key code.

6. An instrument according claim 4, wherein the pitch designation means comprises a keyboard.

7. An instrument according to claim 2, wherein the sound source is a physical sound source.

8. An instrument according to claim 4, wherein the sound source is a physical sound source.

9. An electronic musical instrument according to claim 2, wherein the sound source simulates a bowed instrument and synthesizes an electronic tone similar to a tone of the bowed instrument by using the detected pressure and the calculated moving velocity as parameters respectively corresponding to a bow pressure and a bow velocity.

10. An electronic musical instrument according to claim 4, wherein the sound source simulates a bowed instrument and synthesizes an electronic tone similar to a tone of the bowed instrument by using the generated key code, the detected pressure and the calculated moving velocity as parameters respectively corresponding to resonance frequencies of a string, a bow pressure and a bow velocity.

11. A control apparatus according to claim 1, wherein the pressure detection means has a conductive rubber plate which detects a pressure acting between the conductive rubber and the rotary member.

* * * * *